United States Patent [19]

Christensen et al.

[11] 3,929,840

[45] Dec. 30, 1975

[54] LABILE ESTERS OF (−)(CIS-1,2-EPOXYPROPYL)PHOSPHONIC

[75] Inventors: Burton G. Christensen, Scotch Plains; William J. Leanza, Berkeley Heights; Georg Albers-Schonberg, Princeton, all of N.J.

[73] Assignee: Merck & Co., Inc., Rahway, N.J.

[22] Filed: Apr. 12, 1974

[21] Appl. No.: 460,330

Related U.S. Application Data

[63] Continuation-in-part of Ser. No. 271,855, July 14, 1972, abandoned, which is a continuation-in-part of Ser. No. 849,206, Aug. 11, 1969, abandoned, which is a continuation-in-part of Ser. No. 755,805, Aug. 28, 1968, abandoned, which is a continuation-in-part of Ser. No. 729,444, May 15, 1968, abandoned.

[52] U.S. Cl. ............................................. 260/348 A
[51] Int. Cl.$^2$ ........................................... C07F 9/40
[58] Field of Search ..................... 260/348 R, 348 A

*Primary Examiner*—Norma S. Milestone
*Attorney, Agent, or Firm*—Hesna J. Pfeiffer; J. Jerome Behan

[57] ABSTRACT

Labile esters of (−)(cis-1,2-epoxypropyl)phosphonic acid are prepared from the free acid or salts thereof by reaction with an alcohol or a hydrocarbyl halide. In addition to their utility as intermediates in the synthesis of antibacterially active salts of (−)(cis-1,2-epoxypropyl)phosphonic acid, those esters have significant antibacterial activity.

7 Claims, No Drawings

LABILE ESTERS OF (−)(CIS-1,2-EPOXYPROPYL)PHOSPHONIC

CROSS-REFERENCE TO RELATED APPLICATIONS

This is a continuation-in-part of application U.S. Ser. No. 271,855, filed July 14, 1972, now abandoned; which in turn was a continuation-in-part of application U.S. Ser. No. 849,206, filed Aug. 11, 1969, now abandoned; which in turn was a continuation-in-part of application U.S. Ser. No. 755,805, filed Aug. 28, 1968, now abandoned; which in turn was a continuation-in-part of application U.S. Ser. No. 729,444, filed May 15, 1968, now abandoned.

DESCRIPTION OF THE INVENTION

Although many valuable antibiotics are known for treating various diseases, such antibiotics are in general active against a limited number of pathogens, and certain strains of pathogens frequently develop resistance to a particular antibiotic. These shortcomings have stimulated further research to discover new antibacterial agents, and especially agents which are active against a wide range of pathogens and against strains of pathogens resistant to known antibiotics.

It has recently been discovered that (−) (cis-1,2,-epoxypropyl)phosphonic acid and its salts have significant antibacterial activity against a large number of pathogens. They are useful antimicrobial agents, which are active in inhibiting the growth of gram positive and gram negative pathogenic bacteria, and have activity against species of Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (−) (cis-1,2-epoxypropyl)-phosphonic acid and its salts are useful as antiseptic agents to remove susceptible organisms from pharmaceutical, dental and medical equipment and from other areas subject to infection by such organisms. These compounds can also be used to separate certain microorganisms from mixtures of microorganisms. They are useful in the treatment of bacterial infection in man and animals. Salts of (−) (cis-1,2-epoxypropyl)phosphonic acid are useful as preservatives in industrial applications since they effectively inhibit undesirable bacterial growth in the white water used in paper mills, and in paints, e.g. in polyvinyl acetate latex paint, for which purposes they are incorporated in the white water or in the paint in a manner known to those skilled in those particular arts.

When (−) (cis-1,2-epoxypropyl)phosphonic acid or its salts are used for combatting bacteria in man or lower animals, they may be administered orally in unit dosage forms such as capsules or tablets, or in a liquid solution or suspension. These dosage forms may be prepared using diluents, granulating agents, preservatives, binders, flavoring agents and coating agents in a manner known to those skilled in this particular art.

It is an object of the present invention to provide novel esters of (−) (cis-1,2-epoxypropyl)phosphonic acid which are readily hydrolyzed chemically or are converted biologically to the free acid or salts. These esters have significant antibacterial activity similar to that exhibited by the free acid and the salts. In many cases the antibacterial activity of the labile esters is the same as that of an acid salt and in some cases the antibacterial spectrum is also modified.

It is another object of this invention to provide processes for making these esters of (−) (cis-1,2-epoxypropyl) phosphonic acid. Other objects will be apparent from the ensuing description.

The (−) (cis-1,2-epoxypropyl)phosphonic acid referred to herein rotates plane-polarized light in a counter-clockwise direction (to the left as viewed by the observer) when the rotation of its disodium salt is measured in water (5% concentration) at 405 μ.

The designation cis used in describing the 1,2-epoxypropylphosphonic acid compounds means that each of the hydrogen atoms attached to carbon atoms 1 and 2 of the propylphosphonic acid are on the same side of the oxide ring.

The novel esters of this invention may be represented structurally by Formula I below

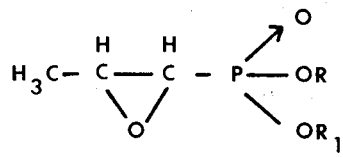

where R represents a labile group and $R_1$ represents R or hydrogen.

Thus, the compounds embraced by this invention are the di-esters of (−) (cis-1,2-epoxypropyl)phosphonic acid and include the compounds where R and $R_1$ are the same, as well as the so-called mixed esters where the groups represented by R and $R_1$ are different. The invention also embraces the mono-esters and salts thereof. The salts may be those of an inorganic cation such as an alkali or alkaline earth metal or a heavy metal; they may also be salts of amines. Examples of such salts are inorganic metallic salts such as the sodium, aluminum, potassium, ammonium, calcium, magnesium, silver and iron salts. Organic salts that may be mentioned as representative include the salts with primary, secondary, or tertiary amines such as mo- noalkylamines, dialkylamines, trialkylamines and nitrogen containing heterocyclic amines. Representative examples are salts with amines such as α-phenethylamine, diethylamine, diethylenetriamine, quinine, brucine, lysine, protamine, arginine, procaine, ethanolamine, morphine, benzylamine, ethylenediamine, N,N'-dibenzylethylenediamine, diethanolamine, piperazine, N-aminoethylpiperazine, dimethylaminoethanol, 2-amino-2-methyl-1-propanol, theophylline, esters of amino acids, and N-methylglucamine.

As is indicated above, the labile esters, both the diesters and the monoesters and the salts thereof are preferred species of the present invention. By the term "labile ester" as used herein is meant a group which is readily hydrolyzed biologically, for example by enzymes in the body fluids of animals including man, to produce the free acid or a salt thereof. The esters which are sufficiently labile are readily determined experimentally, for example by incubation with body fluids to ascertain whether or not under such conditions the ester group is cleaved. Alternatively, other methods, including chemical tests, can be utilized to determine if particular ester groups are sufficiently labile. Thus, the esters which give demonstrable antibiotic activity after heating in an aqueous medium at 37°C. for 2 hours at pH 2.2 or in an aqueous medium at pH 9 for 80 hours can be considered to be labile esters. Suitable labile ester groups representing R and/or $R_1$ that might be mentioned are those of the formula

where $R_2$ represents an acyl group, preferably lower alkanoyl ($C_2$–$C_6$) such as acetyl, pivalolyl, propionyl, isopropionyl, butyryl and isobutyryl, benzoyl or a substituted benzoyl group of the formula

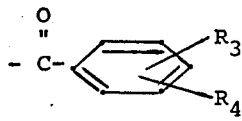

where $R_3$ represents loweralkyl ($C_1$–$C_4$), lower alkoxy ($C_1$–$C_4$), haloloweralkyl ($C_1$–$C_4$), halo, or nitro, and $R_4$ represents $R_3$ or hydrogen, or a group of the formula

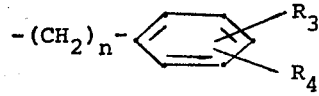

where $n$ is 0 or 1, and $R_3$ and $R_4$ are as defined above. Examples of specific esters that might be mentioned are acetoxymethyl, pivaloyloxymethyl, propionyloxymethyl, isopropionyloxymethyl, butyryloxymethyl, isobutyryloxymethyl, benzoyloxymethyl, p-methoxybenzoyloxymethyl, p-nitrobenzoyloxymethyl, m,m-dimethylbenzoyloxymethyl, o-chlorobenzoyloxymethyl, phenoxymethyl, p-methoxyphenoxymethyl, p-trifluoromethylphenoxymethyl, m-chlorophenoxymethyl, m,m-dimethylphenoxymethyl, p-nitrophenoxymethyl, benzyloxymethyl, p-methoxybenzyloxymethyl, p-nitrobenzyloxymethyl, m-chlorobenzyloxymethyl, and p-trifluoromethylbenzyloxymethyl.

The structural Formula I above is shown for convenience in the planar fashion because the configuration of the novel esters is adequately defined by the name (−) (cis-1,2-epoxypropyl)phosphonic acid ester. However, for the sake of completeness the spatial configuration may be represented structurally as

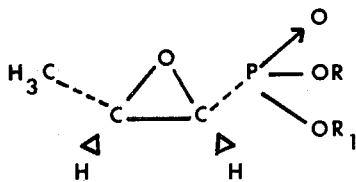

The novel esters of this invention are prepared by reacting a di-heavy metal salt of (−) (cis-1,2-epoxypropyl)phosphonic acid with a halide of the ester group. As the di-heavy metal salts it is preferred to use the disilver salt, although others such as the lead and mercury salts can be used if desired. Best results are achieved when the halide salt of the heavy metal is insoluble in and thus readily separable from the reaction medium. The reaction is conveniently brought about in an organic solvent in which the ester is soluble and the heavy metal halide is insoluble, representative examples of which are dimethoxyethane, butanol, t-butanol, "Cellosolve", petroleum ether and the like. Two moles of halide are used per mole of phosphonate salt inasmuch as this process is normally employed to produce the di-ester, although it will be understood that an excess of either reactant could be utilized if desired. The reaction proceeds well at ambient temperature and there is nothing critical in the reaction time or temperature although, as will be readily understood, the reaction is allowed to proceed until substantially complete formation of the di-ester has taken place. The di-esters obtained by this process are in most cases not crystalline and thus are conveniently characterized by elemental analysis, thin layer chromatography or by nmr analysis.

A mixed ester is conveniently prepared, according to the present invention, by converting a mono-ester monoalkali metal salt to the free acid and then to the monosilver salt by reaction of the free acid with a soluble silver salt. The mono-silver salt mono-ester is then reacted with a hydrocarbyl halide in the same manner as previously described in order to form a mixed ester.

A mixed ester may also be prepared by reacting a (−) (cis-1,2-epoxypropyl)phosphonohalidate, and preferably the chloridate, with an alcohol or a thiol in the presence of an acid binding agent, e.g. a tertiary amine.

As previously stated, the labile esters discussed hereinabove have significant antibacterial activity. All of the esters are likewise useful as intermediates in making salts of (−) (cis-1,2-epoxypropyl)phosphonic acid. The esters are frequently obtained as intermediates in chemical syntheses, one such synthesis being the formation of a (−) (cis-1,2-epoxypropyl)phosphonic acid di-ester by treatment of a 1-chloro-2-hydroxypropylphosphonic acid di-ester with a base.

The following examples are given for the purpose of illustration and not by way of limitation.

EXAMPLE 1

A suspension of 20 g. of calcium (−) (cis-1,2-epoxypropyl)phosphonate and 38.6 g. of silver nitrate in 100 ml. of water is stirred for 2 days in a flask which is protected from light with aluminum foil. The mixture is then filtered and the residue washed with a small amount of water, followed by acetone and air dried. It consists of di-silver (−) (cis-1,2-epoxypropyl)phosphonate.

EXAMPLE 2

To a solution of 1.95 g. of acetoxymethyl bromide in 8 ml. of dry dimethoxyethane there is added 2.0 g. of di-silver (−) (cis-1,2-epoxypropyl)phosphonate and 0.2 g. of potassium bicarbonate. The mixture is stirred at room temperature for 18 hours and then filtered. The filtrate is concentrated in vacuo to an oily residue of bis-acetoxymethyl (−) (cis-1,2-epoxypropyl)phosphonate.

When this procedure is repeated using an equimolar amount of propionoxymethyl bromide or benzoyloxymethyl chloride in place of acetoxymethyl bromide, there is obtained the bis-propionoxymethyl and bis-benzoyloxymethyl esters, respectively, of (−) (cis-1,2-epoxypropyl)phosphonic acid.

EXAMPLE 3

To a solution of 3 g. of chloromethylpivaloate in 20 ml. of tertiary butyl alcohol is added 4 g. of di-silver (−) (cis-1,2-epoxypropyl)phosphonate and 0.5 ml. of triethylamine. The mixture is stirred at 80°C. for 18 hours, then filtered and the filtrate evaporated to dryness under reduced pressure. The residue is taken up in ether, shaken with calcium carbonate and the ethereal solution poured onto a short column of silica gel. The column is eluted with ether. Evaporation of the first eluate fractions yields 1.4 g. of substantially pure bis-pivaloyloxymethyl (−) (cis-1,2-epoxypropyl)phosphonate.

EXAMPLE 4

A mixture of 1.75 g. of di-silver (−) (cis-1,2-epoxypropyl)phosphonate and 1.5 g. of phenacyl chloride in 15 ml. of dimethoxyethane is stirred at room temperature for 12 hours and then at 60°C. for 24 hours. At the end of this time the mixture is filtered, the solid washed with ether, the filtrate and washes combined and evaporated to a syrup. The syrup is extracted with 2 × 10 ml. of ether and the ether extracts evaporated to give a residue of diphenacyl (−) (cis-1,2-epoxypropyl)phosphonate.

EXAMPLE 5

Following the procedures described in Examples 2–4, the di-silver salt of (−) (cis-1,2-epoxypropyl)phosphonic acid is reacted with an equivalent amount of propionyloxymethyl chloride, butyryloxymethyl chloride and isobutyryloxymethyl chloride to obtain the bis-propionyloxymethyl, bis-butyryloxymethyl and bis-isobutyryloxymethyl esters of (−) (cis-1,2-epoxypropyl)phosphonic acid, respectively.

EXAMPLE 6

To a solution of 2 g. of benzoyloxymethyl chloride in 10 ml. of dry dimethoxy ethane is added 2 g. of di-silver (−) (cis-1,2-epoxypropyl)phosphonate and 0.2 g. of potassium bicarbonate. The reaction mixture is stirred for 18 hours at room temperature and then filtered. The filtrate is evaporated under vacuum to afford an oily residue for bisbenzoyloxymethyl (−) (cis-1,2-epoxypropyl)phosphonate.

EXAMPLE 7

When the process of Example 6 is repeated using an equivalent amount of the following methyl chlorides of the formulas A   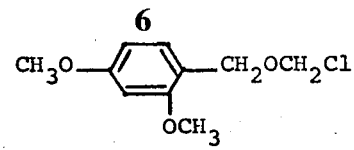

B   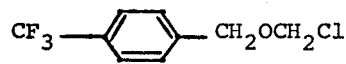

C   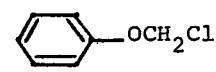

D   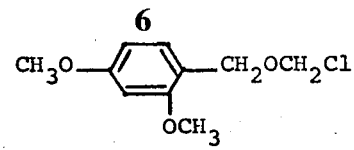

E   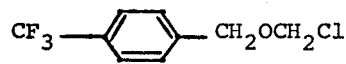

F   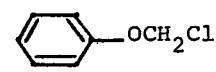

G   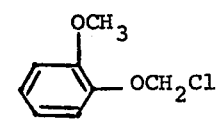

H   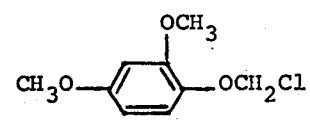

I   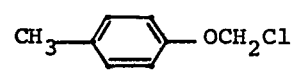

J   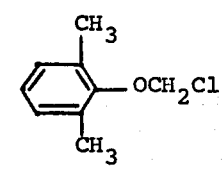

K   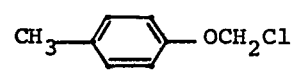

L   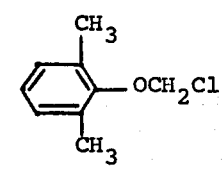

M 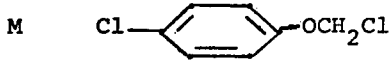

N 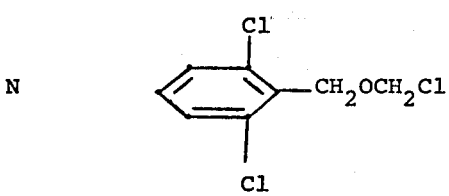

the corresponding bis-substituted benzyloxymethyl and phenyloxymethyl esters of (−) (cis-1,2-epoxypropyl)-phosphonic acid are obtained.

In the same way when substituted benzoyloxymethyl halides such as p-methoxybenzoyloxymethyl chloride, p-nitrobenzoyloxymethyl chloride, m,m-dimethylbenzoylmethyl chloride, or p-chlorobenzoylmethyl chloride is substituted for the benzoyloxymethyl chloride in Example 6, the corresponding substituted benzoyloxymethyl ester is obtained.

EXAMPLE 8

To 25 ml. of methanol is added 3 g. of bispivaloyloxymethyl (−) (cis-1,2-epoxypropyl)phosphonate. To this mixture is gradually added one equivalent of 1 N sodium hydroxide while maintaining the pH of the solution between pH 9.5 and 13.0. The resulting solution is extracted twice with 10 ml. of ethyl acetate. To the extracted solution is added sufficient 1R-120 resin on the acid cycle to adjust the pH to 4.8. After filtering off the resin, the filtrate is lyophilized to afford sodium pivaloyloxymethyl (−) (cis-1,2-epoxypropyl)phosphonate.

In similar manner other bases can be used to obtain the corresponding salt of the monopivaloyl ester.

EXAMPLE 9

When the procedure of Example 8 is repeated using bis-benzoyloxymethyl ester in place of the bis-pivaloyloxymethyl ester, sodium benzoyloxymethyl (−) (cis-1,2-epoxypropyl)phosphonate is obtained.

EXAMPLE 10

When the procedure of Example 8 is repeated using bis-acetoxymethyl ester in place of the bispivaloyloxymethyl ester, sodium acetoxymethyl (−) (cis-1,2-epoxypropyl)phosphonate is obtained.

The sodium salts of the mono-esters obtained as described in the foregoing examples can be converted to other salts in accordance with methods well known in this art.

(−)(Cis-1,2-epoxypropyl)phosphonic acid and its salts, which are the starting materials for the process of this invention, are prepared as follows.

Di-n-butyl propylnylphosphonate (10 grams, 0.043 mole) is dissolved in 50 ml. of methanol and hydrogenated in the presence of 3 g. of 5% palladium on calcium carbonate poisoned with lead acetate at 40 p.s.i. in a Parr apparatus. After the uptake of 67.5 p.s.i.g. of hydrogen (theoretical 71 p.s.i.g.) is observed, the reaction mixture is filtered to remove the catalyst and the catalyst washed with methanol. The filtrate is concentrated under reduced pressure to obtain di-n-butyl cis-propenylphosphonate in the form of a pale yellow residue. The residue is distilled under reduced pressure and the di-n-butyl cis-propenylphosphonate (8.49 g.) boiling at 72°C. at 0.12 mm. is collected. The product analyzes for $C_{11}H_{23}O_3P$. The infrared spectrum of the product shows the absence of an acetylene band at 4.5$\mu$ and the presence of an olefinic band at 6.12$\mu$ characteristic of the cis-olefin. The NMR spectrum also shows that the product is in the cis-configuration.

The di-n-butyl propynylphosphonate used in this example is prepared by adding a solution of methylacetylenemagnesium bromide (0.5 mole) dissolved in a mixture of 2 liters of benzene and 300 ml. of tetrahydrofuran dropwise with stirring to a solution of 96.1 g. (0.5 mole) of di-n-butylchlorophosphonate in 1 liter of benzene. The methylacetylene Grignard reagent is added during 3 hours and the reaction mixture is stirred vigorously during the addition while keeping the temperature below about 28°C. After the addition is complete, the clear solution is allowed to stand at room temperature for about 16 hours. 1 Liter of an aqueous ammonium chloride solution is added to the reaction mixture and the water layer is separated and extracted twice with benzene. The benzene extracts are combined with the benzene layer and the solvent is evaporated under reduced pressure to yield di-n-butyl propynylphosphonate in the form of an oil weighing 61.5 g. The oil is distilled under reduced pressure, yielding an early fraction with a boiling point of 11°C. at 0.5 mm. and a clear yellow liquid main fraction consisting of di-n-butyl propynylphosphonate weighing 47.3 g. and boiling at 102°C. at 0.15 mm.

Di-n-butyl cis-propenylphosphonate (9.7 g.) is refluxed in 80 ml. of concentrated hydrochloric acid (12.4 N) for 15 hours in an oil bath maintained at 108°–117°C. The reaction mixture is allowed to cool to room temperature, after which the solution is concentrated in vacuo with heating. Water (50 ml.) is added to the residue, and the evaporation process is repeated yielding 6.19 g. of a brown viscous residue. The residue is dissolved in 25 ml. of ethyl ether, and the ether solution is extracted with 3 × 10 ml. of water. Evaporation of the ether layer yields 2.56 g. of a brown residue. Evaporation of the aqueous extracts in vacuo yields 3.43 g. of a pale yellow viscous oil. The residue obtained from the aqueous extract is purified by dissolving it in 25 ml. of ether, and extracting the ether solution with 12 ml. of water. Evaporation of the aqueous extract in vacuo with heating yields cis-propenylphosphonic acid, a pale yellow viscous oil. Infrared spectra of the yellow oil shows the characteristics olefinic band at 6.1$\mu$.

Cis-propenylphosphonic acid (0.50 g., 0.041 mole) is dissolved in 0.5 ml. of water, and the solution neutralized to pH 5.5 by careful addition of ammonium hydroxide. Sodium tungstate (10 mcg., 0.00034 mole) is added and the mixture is heated to 55°C. on a water bath. Hydrogen peroxide (0.5 cc.) is added, and the heating continued for 1½ hours. The reaction mixture is then cooled to room temperature, and the solvent removed by freeze-drying. The residue is dissolved in 50 ml. of methanol, and the insoluble inorganic material filtered off. Upon concentration of the solution, crystalline ammonium salt of (±) (cis-1,2-epoxypropyl)phosphonic acid is obtained. The product is characterized by its infrared and NMR spectra.

The ammonium salt of (+) (cis-1,2-epoxypropyl)-phosphonic acid (0.5 g., 0.0032 mole) is treated with (+) α-phenethylamine (0.35 g., 0.0028 mole) in 20 ml. of methanol. The solution is evaporated to a syrup, the residue is redissolved in a small volume of methanol and is seeded with crystals of the (+) (α-phenethylamine salt, m.p. 139°–140°C. Some crystals settle out of the solution upon standing. Acetone (5 ml.) is added, and the crystallization is allowed to continue. The crystals are then filtered off and washed with acetone to yield the (+) α-phenylethylamine salt of (−) (cis-1,2-epoxypropyl)phosphonic acid, m.p. 131°–132°C. After two crystallizations from methanol, 30 mg. of the salt, m.p. 140°–142°C., are obtained.

The free acid is obtained by passing a solution of the salt over an ion exchange resin such as Dowex-50 or IR-120 on the H$^+$ cycle. The eluate contains the free acid which may be converted to a salt by treatment with a base.

This treatment is very simple, and at its most basic consists of taking the eluate, which is an aqueous solution of the free acid, (−) (cis-1,2-epoxypropyl)-phosphonic acid, and adding an equivalent of solid calcium hydroxide (when the calcium is desired); or sodium hydroxide (when the sodium salt is desired). The residue can be monitored using a pH meter. The reaction mixture is then lyophilized and the desired salt, either the calcium, or the sodium recrystallized, using standard techniques available to those skilled in the art or in the literature.

In addition, the calcium salt of (−) (cis-1,2-epoxypropyl)phosphonic acid can be obtained in a similar fashion by use of an ion exchange resin on the calcium cycle, such as Amberlite IR-120, (Ca).

The sodium salt of (−) (cis-1,2-epoxypropyl)-phosphonic acid, another useful starting material instead of the calcium salt, can be prepared by use of an ion exchange resin on the sodium cycle, such as Amberlite IR-120 (Na).

Any departure from the above description which conforms to the present invention is intended to be included within the scope of the claims.

What is claimed is:
1. A labile ester of (−) (cis-1,2-epoxypropyl)phosphonic acid of the formula

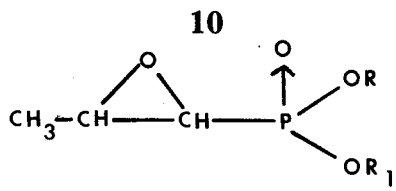

wherein R is hydrogen or R$_1$, and R$_1$ is a group of the formula
—CH$_2$OR$_2$
wherein R$_2$ represents lower alkanoyl, benzoyl, a substituted benzoyl group of the formula

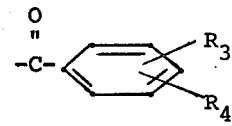

where R$_3$ represents loweralkyl, loweralkoxy, haloloweralkyl, halo or nitro and R$_4$ represents R$_3$ or hydrogen, or a group of the formula

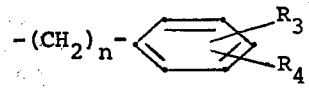

where $n$ is 0 or 1 and R$_3$ and R$_4$ are the same as defined above, and the sodium salt thereof when R is hydrogen.

2. A compound of claim 1 which is bis-acetoxymethyl (−) (cis-1,2-epoxypropyl)phosphonate.

3. A compound of claim 1 which is bis-pivaloyloxymethyl (−) (cis-1,2-epoxypropyl)phosphonate.

4. A compound of claim 1 which is bis-benzoyloxymethyl (−) (cis-1,2-epoxypropyl)phosphonate.

5. The compound of claim 1 which is bis-p-methoxybenzyloxymethyl (−) ( cis-1,2-epoxypropyl)phosphonate.

6. The compound of claim 1 which is bis-p-tolyloxymethyl (−) (cis-1,2-epoxypropyl)phosphonate.

7. The compound of claim 1 which is sodium(-pivaloyloxymethyl) (−) (cis-1,2-epoxypropyl)phosphonate.

* * * * *